United States Patent

Dearman

[15] 3,653,574
[45] Apr. 4, 1972

[54] PIPE CLAMPING APPARATUS

[72] Inventor: Timothy C. Dearman, 4191 East Stanley Road, Mt. Morris, Mich. 48458

[22] Filed: Dec. 11, 1969

[21] Appl. No.: 884,140

[52] U.S. Cl. ..............................228/49, 29/200 J, 269/130
[51] Int. Cl. ..........................................................B23k 1/14
[58] Field of Search..................269/130, 131, 132; 29/200 J, 29/200 P; 228/4, 44, 49

[56] References Cited

UNITED STATES PATENTS

| | | | |
|---|---|---|---|
| 1,848,527 | 3/1932 | Hickey | 269/130 X |
| 1,940,910 | 12/1933 | Hickey | 269/130 X |
| 2,167,887 | 8/1939 | Graham et al. | 113/102 |
| 3,047,286 | 7/1962 | Kinne | 269/130 X |
| 3,284,883 | 11/1966 | Haverfield et al. | 29/200 |
| 3,408,729 | 11/1968 | Gersbacher | 228/44 X |
| 3,416,830 | 12/1968 | Karr | 29/200 |
| 3,467,295 | 9/1969 | Watson | 228/49 |

Primary Examiner—John F. Campbell
Assistant Examiner—R. J. Craig
Attorney—Learman, Learman & McCulloch

[57] ABSTRACT

Clamping apparatus for use in joining two lengths of pipe to one another comprises a carrier or body adapted to be seated at one end of one pipe and to which is anchored one end of a flexible, elongate clamping chain which may be secured at any selected position along its length to the body so as to form with the latter a loop encircling the one pipe. Mounted on that portion of the clamping chain between the points of its connection to the body is a plurality of support members each of which is adjustable longitudinally of the chain. Each support member extends laterally of the chain to a position beyond the end of the one pipe section and is provided with adjustable supporting fingers that are adapted to engage and support the end of the pipe to be joined to the one pipe. An auxiliary, adjustable support may be connected to the body for assisting in the aligning and supporting of the two pipe lengths.

15 Claims, 7 Drawing Figures

Patented April 4, 1972
3,653,574
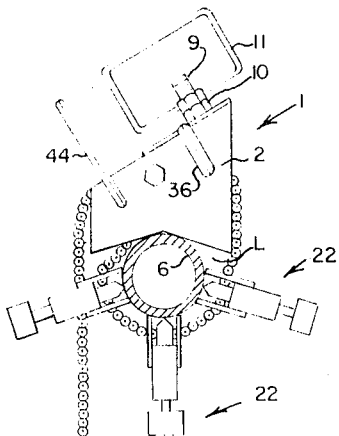
FIG. 1
FIG. 2
FIG. 3
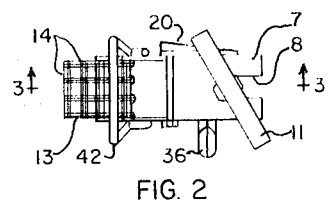
FIG. 4
FIG. 5
FIG. 6
FIG. 7
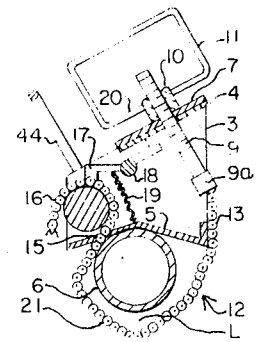
INVENTOR.
TIMOTHY C. DEARMAN
BY
Learman, Learman + McCulloch

PIPE CLAMPING APPARATUS

The invention disclosed herein relates to clamping apparatus adapted for use in welding two pipe lengths to one another and more particularly to a clamping device which is usable, without modification, with pipes of greatly differing size.

In the welding of adjacent lengths of pipe it is essential that the axes of the two pipe lengths be aligned. If the axes are not aligned, the joint between the two pipe lengths necessarily is irregular and is unacceptable. The necessity of maintaining axial alignment of adjacent pipe lengths has been recognized heretofore, of course, and various kinds of devices have been proposed to facilitate handling of the pipe lengths prior to and during their being joined. Not all of the previously known devices have been altogether satisfactory, however, for a number of reasons. For example, the previously known devices have been incapable of handling pipes the diameters of which vary more than a few inches. Consequently, it has been necessary heretofore to provide welders with a plurality of different size pipe clamps so as to enable the welders to work uninterruptedly with pipes of different sizes.

Another disadvantage of known pipe clamps is that they have required different fittings for use on pipes of different kinds. For example, fittings intended for use in joining two cylindrical pipe lengths have not been capable of use when joining an elbow pipe to a cylindrical pipe, and vice versa. Moreover, some fittings are usable when joining pipe lengths at right angles to one another, but have not been usable when two adjacent pipe links must be joined to one another at an angle other than a right angle.

A further disadvantage of some of the known pipe clamps is that they preclude relative adjustment, such as rotation, of the adjacent pipes after they have been positioned end to end. It is frequently necessary, however, that the pipe length to be joined to a string of pipe has to be capable of fine adjustment following its initial positioning. If the clamp apparatus interferes with such fine adjustment substantial time is lost in effecting proper positioning of the pipes.

An object of this invention is to provide pipe clamping and supporting apparatus which overcomes the disadvantages of the prior art constructions.

Another object of the invention is to provide a pipe clamp which is capable of use, without modification, in conjunction with pipes of greatly differing diameters.

A further object of the invention is to provide a pipe clamp which is adapted for use in conjunction with pipes of any configuration and which enables such pipes to be joined to one another in any desired relationship.

Another object of the invention is to provide clamp apparatus of the character described which enables substantially universal adjustment of the pipe sections relatively to each other and without interference from the clamp apparatus.

Other objects and advantages of the invention will be pointed out specifically or will become apparent from the following description when it is considered in conjunction with the appended claims and the accompanying drawings, in which:

FIG. 1 is an end elevational view of apparatus constructed in accordance with the invention and applied to a pipe, the pipe being shown in section;

FIG. 2 is a top plan view of the apparatus;

FIG. 3 is a sectional view taken on the line 3—3 of FIG. 2, but with certain parts omitted for clarity;

FIG. 4 is a fragmentary, side elevational view of one of the adjustable pipe support members;

FIG. 5 is a sectional view taken on the line 5—5 of FIG. 4, the chain being omitted and the latch being shown in an adjusted position;

FIG. 6 is a side elevational view of the apparatus shown in FIG. 1; and

FIG. 7 is a view similar to FIG. 6, but illustrating the apparatus in a different environment.

Apparatus constructed in accordance with the disclosed embodiment of the invention comprises a body or carrier member 1 having a pair of parallel plates 2 and 3 joined at their upper ends by a transverse plate 4 and at their lower ends by a generally V-shaped transverse bottom plate 5 which is adapted to seat upon the upper surface of a cylindrical pipe 6. Atop the plate 4 is a bearing plate 7, the plates 4 and 7 being slotted as at 8 to accommodate an anchor screw 9 on which is threaded a nut 10. Fixed to the nut 10 is an operating handle 11 by means of which the nut 10 may be rotated so as to effect longitudinal adjustment of the anchor screw 9.

Anchored to the screw 9 by means of a known coupling 9a is one end of a flexible, elongate clamping member 12 which preferably comprises a three strand leaf chain 13 having parallel, longitudinally spaced apart bars 14. The opposite end of the chain 13 is free and is adapted to be passed through an opening 15 formed in the bottom wall 5 of the body 1 and extended around a mandrel 16 which spans the distance between the body walls 2 and 3. A toothed locking dog 17 is fixed on a rock shaft 18 journaled in the body 1 and is biased by a spring 19 toward the mandrel 16 so as normally to be urged into locking relation with the chain. The dog 17 may be rocked out of its locking position by a lever 20 fixed on the shaft 18.

The chain 13 may be of any desired length. For example, the length of the chain may be such that, when it is in the condition shown in FIGS. 1 and 3, the intermediate portion 21 of the chain between the zones defined by anchor screw 9 and the locking dog 17 is sufficient to enable the chain, together with the body wall 5, to form a loop L of such size as to encircle a pipe of 16 inches in diameter.

The apparatus includes a plurality of supporting members 22 carried by the loop-forming-portion 21 of the chain 13. Each of the members 22 is identical and comprises a pair of parallel, spaced apart bars 23 joined to one another by cross bars 24. Each of the bars 23 is provided with a slot 25 through which the chain 13 may be threaded so as to permit adjustment of the support member longitudinally of the chain. A latching dog or lever 26 is pivoted as at 27 between the bars 23 and is provided with a plurality of teeth 28 which are adapted to project through the spaces between the chain bars 14 so as to maintain each support member 22 in any selected position of adjustment longitudinally of the chain. Fixed to each finger 26 is an operating lug 29 to facilitate pivotal movement of the latching finger, and each finger is urged by a spring 30 toward its chain locking position.

Each of the bars 23 includes an extension 31 between which is secured a tubular housing 32 having an internally threaded bore in which is accommodated a threaded screw 33. At one end of each screw 33 is a finger piece 34 and at the opposite end of each screw is a work engaging finger 35 which is adjustable back and forth longitudinally of the screw 33 by rotation of the latter. The fingers 35 define a plane which is parallel to but spaced from the plane of the loop L.

The body 1 preferably includes an anchor hook 36 secured to the wall 2 and which is adapted to be used in conjunction with an auxiliary support member 37 comprising a chain 38 to one end of which is fixed an adjusting screw 39 that extends through a coupling 40 which may be pivoted to a work engaging clamp 41. The effective length of the chain 38 may be adjusted by a wing nut 42 on the screw 39 and the clamp 41 preferably includes an adjustable screw 43 so as to enable the clamp to be secured to and removed from a pipe length.

A handle 44 preferably is secured to the body 1 so as to facilitate handling of the latter.

In FIG. 6 there is illustrated a cylindrical pipe length 6 to one end of which is to be joined, as by welding, one end of a cylindrical pipe length 45 which, in this instance, is the same diameter as that of the pipe 6. As is conventional, the confronting ends of the pipes 6 and 45 are beveled to provide a substantially V-shaped groove 45a for the reception of the welding material.

To position the pipes 6 and 45 in proper locations to be joined, the two pipe lengths should be coaxial so that, when the pipes are joined, the inner surface of the joint will be smooth around its entire circumference.

To condition the apparatus for operation, the locking dog 17 is moved out of locking engagement with the chain 13 so as to enable the intermediate portion 21 thereof to form a loop L of such size as to pass freely over the end of the pipe 6. The free end of the chain 13 then may be pulled in such direction as to reduce the size of the loop so that it more closely, but loosely, embraces the pipe 6. The positioning of the clamp apparatus on the pipe 6 is such that the body 1 is supported wholly by the pipe 6, but the extensions 31 of the support member 22 project beyond the plane of the loop and beyond the end of the pipe 6.

When the body 1 is located properly adjacent the end of the pipe 6, the support members 22 may be adjusted independently of one another longitudinally of the chain 13 so as to provide a plurality of circumferentially spaced supporting points for the pipe 45. When the support members 22 are located to the satisfaction of the operator, the clamping chain 12 may be drawn tightly around the pipe 6 by rotating the adjusting nut 10 in such direction as to decrease the size of the loop L. In these positions of the parts, the pipe 45 may be introduced between the supporting fingers 35 and the latter adjusted so as to engage the pipe 45. When the pipe 45 is accommodated between the workpiece engaging parts 35, the latter may be adjusted inwardly and outwardly relatively to the loop of the chain 13 so as to align the pipe 45 with the pipe 6. Although the fingers 35 engage the pipe 45, they need not prevent rotation of the latter relatively to the pipe 6. Consequently, relative rotation of the pipes is possible so as to effect proper orientation thereof.

If the pipe 45 is relatively short, as shown in FIG. 6, the auxiliary supporting means 37 may be utilized by fitting the clamp 41 to the remote end of the pipe 45 and adjusting the effective length of the chain 38 so as to maintain the latter taut, thereby assisting in supporting the pipe length 45. Should the pipe length 45 be too long to permit use of the apparatus 37, the remote end of the pipe may be supported by a jack or any other suitable device, as is conventional.

FIG. 7 discloses the apparatus used to join an elbow pipe 46 to the pipe 6. The assembly of the clamp apparatus with the pipe 6 is the same as has been described earlier and the fitting of the pipe 46 to the free end of the pipe 6 is the same as has been described in connection with the pipe 45. As is apparent from FIG. 7, therefore, the clamp apparatus may be used without modification to join pipe sections of greatly differing shapes. The ability of the pipe length supported by the fingers 35 to rotate is particularly advantageous when the pipe is an elbow or some other non-cylindrical configuration.

If the length of the chain 13 is sufficient to form a loop L capable of accommodating a pipe 16 inches in diameter, the loop also can accommodate a pipe having any smaller diameter. In practice, a chain of such length can be used on pipes having diameters varying from 2 to 16 inches.

The disclosed embodiment is representative of a presently preferred form of the invention, but is intended to be illustrative rather than definitive thereof. The invention is defined in the claims.

I claim:

1. Pipe clamp apparatus adapted for removable mounting on a length of pipe, said apparatus comprising a body; a flexible, elongate clamping member; first anchor means carried by said body for anchoring one end portion of said clamping member to said body; second anchor means carried by said body for anchoring a selected portion of said clamping member between its ends to said body whereby said body and the anchored portions of said clamping member define a loop of selected diameter; a plurality of elongate, independent support bars having inner and outer surfaces, each of said support bars having an opening therein for sliding accommodation of said clamping member whereby said support bars are freely slideable circumferentially of said loop and releasable latch means carried by each of said support bars for releasably latching the latter in any selected position of adjustment circumferentially of said loop, the opening in each of said support bars being so located that the inner surface of each of said support bars is engageable over a substantial portion of the length thereof with a pipe accommodated within said loop.

2. The apparatus set forth in claim 1 including means for adjusting at least one of said anchor means to vary the diameter of said loop.

3. The apparatus set forth in claim 1 wherein said opening in each of said support bars comprises a slot located wholly between the inner and outer surfaces thereof.

4. The apparatus set forth in claim 1 including auxiliary support means; and means connecting said auxiliary support means to said body.

5. The apparatus set forth in claim 1 wherein each of said support bars extends transversely of said clamping member.

6. The apparatus set forth in claim 5 wherein each of said support bars includes an extension, each of said extensions having a work-engageable part adjacent one end thereof and which extends in a direction inwardly of said loop.

7. The apparatus set forth in claim 6 wherein each of said parts is adjustable relatively to its support bar in directions inwardly and outwardly of said loop.

8. Clamp apparatus for use in joining two lengths of pipe or the like together, said apparatus comprising a carrier adapted to seat on one of said pipes adjacent one end thereof; an elongate, flexible clamp member; first means anchoring said clamp member adjacent one end thereof to said carrier; second means anchoring said clamp member to said carrier at a selected zone spaced from said one end of said clamp member whereby that portion of said clamp member between said first and second anchoring means forms a loop of such diameter as to embrace said one of said pipes; a plurality of independent, elongate support bars having inner and outer surfaces, each of said bars having a slot in which said clamp member is accommodated for free sliding adjustment circumferentially of said loop, each of said slots being so located that the inner surface of each of said support bars is capable of engagement over substantially its full length with said one of said pipes; and an extension carried by each of said support bars and extending laterally of said loop so as to project beyond said one end of said one of said pipes and provide a support for the second of said pipes.

9. The apparatus set forth in claim 8 including auxiliary support means; and means connecting said auxiliary support means to said carrier.

10. The apparatus set forth in claim 8 including releasable latch means for releasably locking any selected one of said support bars at any selected position of adjustment circumferentially of said loop.

11. The apparatus set forth in claim 8 wherein there are three of said support bars.

12. The apparatus set forth in claim 8 wherein at least one of said anchoring means is releasable to enable the length of said portion of said clamping means and the size of said loop to be varied.

13. The apparatus set forth in claim 8 wherein each of said support bars carries a part adapted to engage said second of said pipes.

14. The apparatus set forth in claim 13 wherein each of said parts is adjustable for movement in directions toward and away from said second of said pipes.

15. The apparatus set forth in claim 8 including means for adjusting at least one of said anchoring means to vary the diameter of said loop.

* * * * *